(12) United States Patent
Ichiki et al.

(10) Patent No.: US 6,171,372 B1
(45) Date of Patent: Jan. 9, 2001

(54) NITROGEN DIOXIDE ABSORBENT

(75) Inventors: Masayoshi Ichiki, Osaka; Yuki Sairyo, Suita; Atsushi Fukuju, Toyonaka, all of (JP)

(73) Assignee: Hitachi Zosen Corporation, Osaka (JP)

( * ) Notice: Under 35 U.S.C. 154(b), the term of this patent shall be extended for 0 days.

(21) Appl. No.: 09/168,860

(22) Filed: Oct. 8, 1998

(30) Foreign Application Priority Data

| Oct. 13, 1997 | (JP) | 9-278320 |
| Oct. 27, 1997 | (JP) | 9-294062 |
| Oct. 28, 1997 | (JP) | 9-295156 |
| Nov. 7, 1997  | (JP) | 9-305415 |

(51) Int. Cl.$^7$ ................................. B01D 53/04
(52) U.S. Cl. ............... 95/129; 95/900; 96/108; 423/239.1; 423/239.2
(58) Field of Search ............... 95/128, 129, 900; 423/239.1, 239.2, 402; 96/108

(56) References Cited

U.S. PATENT DOCUMENTS

| 4,157,375 | * | 6/1979  | Brown et al. | 423/239.2 |
| 4,668,255 | * | 5/1987  | Govind       | 95/129    |
| 4,713,091 | * | 12/1987 | Govind       | 95/129 X  |
| 4,798,711 | * | 1/1989  | Neal et al.  | 95/129 X  |
| 5,116,586 | * | 5/1992  | Baacke et al.| 423/239.2 |
| 5,231,063 | * | 7/1993  | Fukumoto et al. | 423/239.1 X |

FOREIGN PATENT DOCUMENTS

| 968927    |   | 6/1975 | (CA) . |           |
| 4221451   | * | 1/1994 | (DE)   | 423/239.1 |
| 8-192049  |   | 7/1996 | (JP) . |           |
| 10-211427 |   | 8/1998 | (JP) . |           |
| WO 94/17907 |   | 8/1994 | (WO) . |           |

* cited by examiner

*Primary Examiner*—Robert H. Spitzer
(74) *Attorney, Agent, or Firm*—Armstrong, Westerman, Hattori, McLeland & Naughton (57) ABSTRACT

The present invention provides a nitrogen dioxide absorbent for the exhaust gas purifying facility designed to remove by absorption or adsorption of $NO_2$ from a gas (such as ventilation gas from road tunnels) containing $NO_x$ in low concentrations. The absorbent is composed of a porous carrier and a basic amino acid and/or organic amine compound supported thereon. The absorbent is produced by impregnating a porous carrier sequentially with two aqueous solutions each containing in an amount of, for example, 0.5–3.0 mol/l (preferably 1.0–2.0 mol/l) of basic amino acid and 0.5–3.0 mol/l (preferably 1.0–2.0 mol/l) of organic amine compound, or impregnating a porous carrier with a solution containing 0.5–3.0 mol/l (preferably 1.0–2.0 mol/l) of basic amino acid and/or 0.5–3.0 mol/l (preferably 1.0–2.0 mol/l) of organic amine compound.

19 Claims, 4 Drawing Sheets

NITROGEN DIOXIDE ABSORBENT

BACKGROUND OF THE INVENTION

1. Field of the Invention

The present invention relates to a nitrogen dioxide ($NO_2$) absorbent or adsorbent for automotive exhaust gas purifying facilities to remove $NO_2$ by absorption or adsorption from ventilation gas discharged from road tunnels which contains nitrogen oxides ($NO_x$) in low concentrations.

2. Description of the Related Art

A conceivable common way of removing by absorption $NO_2$ (which is an acidic gas) from $NO_x$-containing gas is by reaction with alkali for fixation into nitrate or nitrite. In actual practice, however, very little $NO_2$ is absorbed when air containing several ppm of $NO_2$ is bubbled in an aqueous solution of KOH.

In contrast, $NO_2$ in very low concentrations as above can be absorbed and removed effectively by the use of a solid absorbent consisting of a porous carrier (such as titania or alumina which has solid acid properties) and KOH impregnated into and supported on the carrier, which had previously been proposed by the present inventors. (See Japanese Patent Laid-open No. 211427/1998.)

The present inventors studied in detail the nitrogen dioxide absorbent composed of a carrier of solid acid or activated carbon and a hydroxide of strong alkali (such as K and Na) supported thereon. As the result, they found the following problems involved in it.

Figure 1:
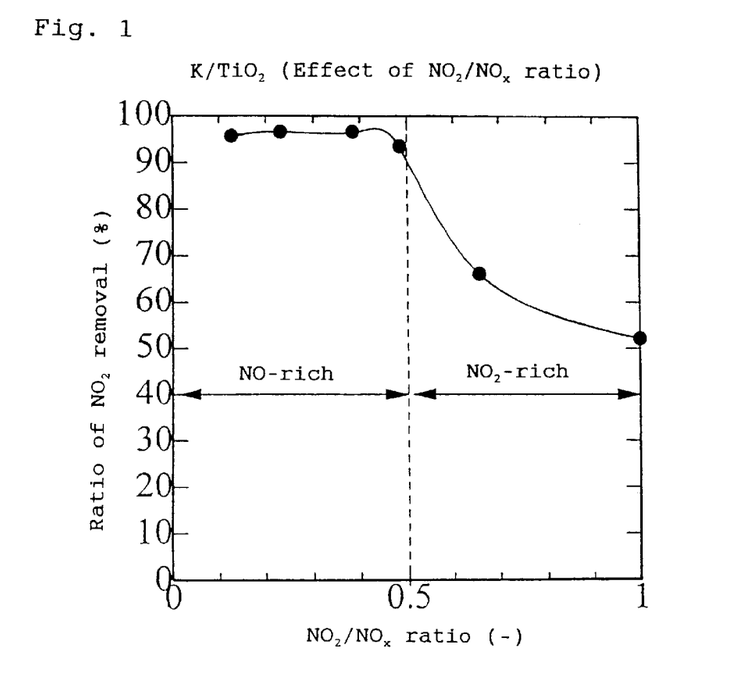
FIG. 1 is a graph showing the relation between the $NO_2/NO_x$ ratio and the $NO_2$ removal ratio.
Figure 2:
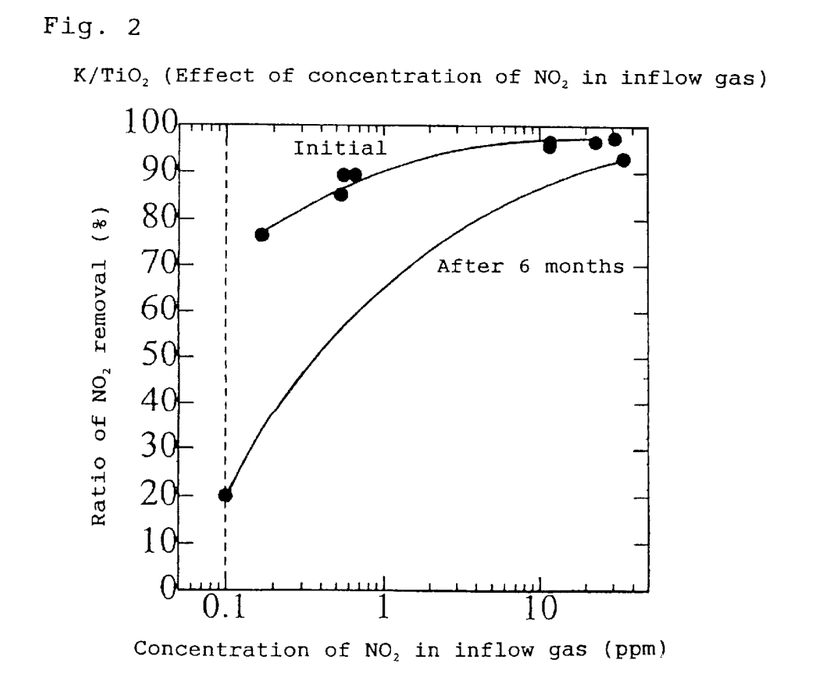
FIG. 2 is a graph showing the relation between the $NO_2$ concentration at the entrance and the $NO_2$ removal ratio.

In the ase of a carrier of solid acid:
(1) A nitrogen dioxide absorbent composed of a carrier of solid acid and a hydroxide of strong alkali (such as K and Na) supported thereon is low in absorption rate unless $NO_x$ contain s nitrogen monoxide (NO) in an amount equal to or more than $NO_2$. See FIG. 1.
(2) If $NO_x$ contains NO in an amount equal to or more than $NO_2$, the absorbing rate of $NO_2$ is approximately linearly proportional to its concentration at 10 ppm or above. (Incidentally, the absorbing rate of NO is constant regardless of its concentration under the same absorbing condition.) However, in concentrations at 5 ppm or below, the absorbing rate of $NO_2$ begins to decrease with decreasing concentration; it is very low at 1 ppm or below. This tendency becomes remarkable according as more $NO_2$ is accumulated in the absorbent. See FIG. 2.
(3) If $NO_x$ contains NO in an amount equal to or more than $NO_2$ and if $NO_x$ is not accumulated initially in large amounts on the surface of the absorbent, NO and $NO_2$ are absorbed almost equally and hence the absorbent is rapidly consumed.

Figure 3:
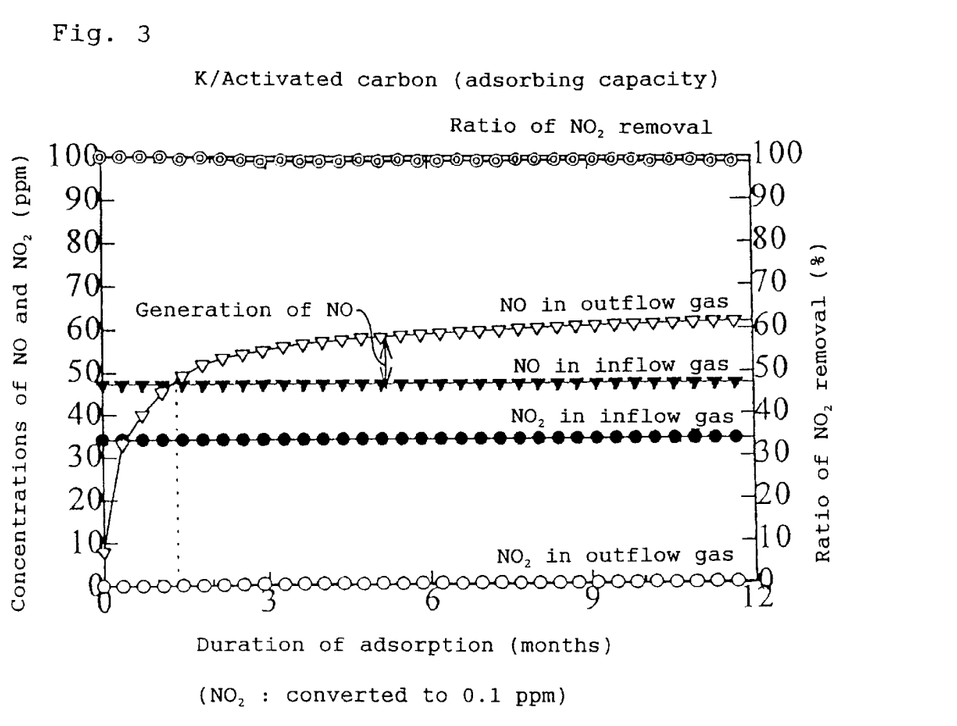
FIG. 3 is a graph showing the relation between the adsorption time and the concentrations of NO and $NO_2$.

In the case of a carrier of activated carbon:
(4) Activated carbon (well known as an adsorbent of $NO_2$) adsorbs $NO_2$ alone and adsorbs and absorbs $NO_2$ efficiently even in the absence of NO. However, its absorbing rate decreases at 1 ppm or below according as the accumulated amount of $NO_2$ increases.
(5) Activated carbon releases as much NO as one-half to one-quarter the amount of $NO_2$ adsorbed.
(6) An absorbent composed of activated carbon and a strong alkali hydroxide supported thereon absorbs NO and $NO_2$ almost equally in the initial stage, like an absorbent employing an acid solid as the carrier; however, its absorbing rate of NO decreases according as the accumulated amount of $NO_x$ increases on the surface of the absorbent. After a large amount of $NO_x$ has accumulated, it reversibly releases as much NO as one-half to one-quarter the amount of $NO_2$ absorbed. This results in an increase in NO concentration in the gas phase. See FIG. 3.

The present inventors have interpreted these phenomena as follows.
(1) $NO_2$ in low concentrations does not react directly with alkali.
(2) At first, $NO_2$ is adsorbed to the carrier. The adsorbed $NO_2$ then changes into a compound which readily reacts with alkali. Finally, this compound reacts with alkali for its fixation.
(3) Presumably, the compound in (2) readily reactive with alkali is $N_2O_3$ in the case of solid acid carrier supporting strong alkali, and it is $N_2O_4$ in the case of activated carbon carrier supporting strong alkali.

$$NO+NO_2 \rightarrow N_2O_3$$

$$2NO_2 \rightarrow N_2O_4$$

(4) In either case, those compounds in (3) decompose into nitric acid or nitrate (which is stable) and nitrous acid or nitrite (which is unstable).

$$N_2O+2MOH \rightarrow 2MNO_2+H_2O$$

$$N_2O_4+2MOH \rightarrow MNO_3+MNO_2+H_2O$$

(where, M: alkali metal)
(5) The nitrous acid or nitrite is oxidized into nitric acid or nitrate (which is stable) or decomposed into NO, which is released.

$$2MNO_2+O_2 \rightarrow 2MNO_3$$

$$2MNO_2+H_2O \rightarrow NO_2+2MOH+NO \text{ (released)}$$

(6) Usually, strong alkali nitrite is not readily decomposed but is oxidized into nitrate, and weak alkali nitrite is readily decomposed into NO.

It is concluded from the foregoing discussion that a d esirable nitrogen dioxide absorbent should meet the following requirements.
(a) The absorbent should have a catalytic action to denature $NO_2$ into a compound readily reactive with alkali.
(b) The absorbent should have alkali densely arranged around the active site of the catalyst in (a) so that the denatured product of $NO_2$ reacts with alkali.
(c) The resulting alkali nitrate and nitrite in (b) should have moderate stability so that it fixes the adsorbed $NO_2$ in a stable manner and permits it to diffuse rapidly outward from the vicinity of the active site for $NO_2$ denaturation in (a).

The concept mentioned above is depicted in FIG. 4.
$NO_2$ in the gas phase is adsorbed at the active sites of the catalyst and is denatured there into a form readily reactive with alkali. The denatured product rapidly reacts with alkali hydroxide near the active site, and the resulting nitrate and nitrite are retained stably. The active site of the catalyst becomes vacant, and the cycle of adsorption-denaturation can be repeated.

Figure 4:
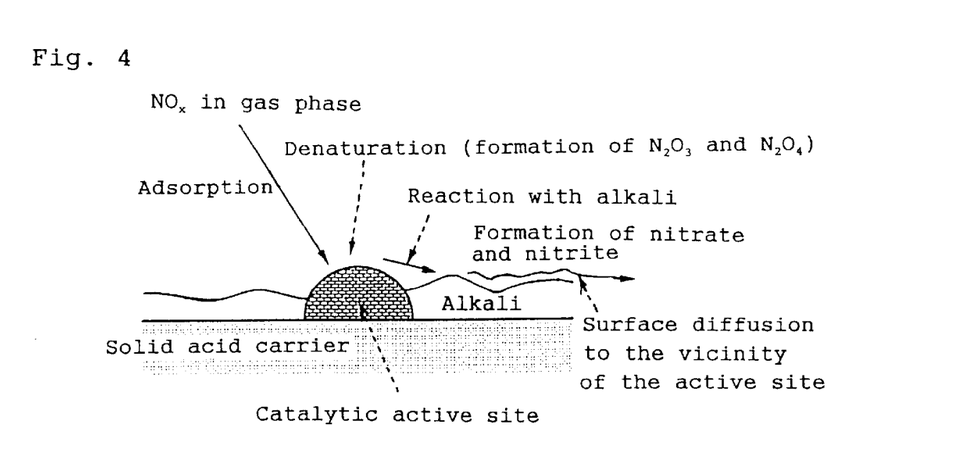
FIG. 4 is a conceptual diagram showing the absorption of $NO_2$ on the surface of the nitrogen dioxide absorbent.

The thus formed nitrate or nitrite has its anions ($NO_3^-$ or $NO_2^-$) dispersed into the vicinity from near the active site. Thus free alkali is regenerated near the active site, and it repeats its reaction with the denatured product forming at the active site.

At an early time when the absorption of $NO_2$ has just begun, alkali is present in large amounts near the active site and hence the rate of absorption is limited by the rate of absorption of $NO_2$ to the active site. Accordingly, as the amount of $NO_2$ absorbed increases, the rate of absorption is limited by the rate of diffusion into the vicinity of the active site.

The present inventors had previously proposed a carrier of titania ($TiO_2$) impregnated with a manganese (Mn) salt, followed by drying and firing. This carrier meets the requirement of (a), or it has a catalytic action for denaturation of $NO_2$. See Japanese Patent Laid-open No. 192049/1996.

The present inventors had also proposed a nitrogen dioxide absorbent employing a carrier impregnated with a hydroxide of alkali metal (such as K and Na). See Japanese Patent Laid-open No. 211427/1998.

Figure 5:
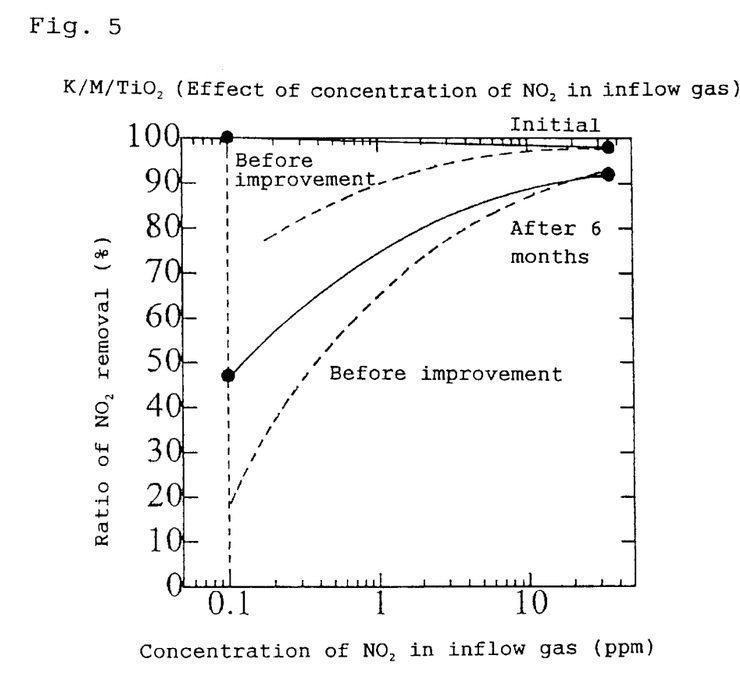
FIG. 5 is a graph showing the relation between the $NO_2$ concentration at the entrance and the $NO_2$ removal ratio.

The above-mentioned absorbent was capable of efficient absorption of $NO_2$ in low concentrations (1 ppm or below). This was a remarkable improvement as expected. However, it was found that the rate of absorption of $NO_2$ in low concentrations rapidly decreases according as $NO_2$ accumulates on the surface of the absorbent. See FIG. 5. A probable reason for this is that strong alkali nitrate or nitrite is so stable that it does not permit its anions ($NO_2^-$ or $NO_3^-$) to readily diffuse from near the active site, with the result that free alkali rapidly decreases near the catalytic active site.

SUMMARY OF THE INVENTION

The present inventors looked for an alkali which meets the requirement of (c). As the result, they found that desired characteristic properties are obtained by a basic amino acid, particularly arginine, and an organic amine compound, particularly guanidine.

It is an object of the present invention to provide a nitrogen dioxide absorbent which comprises a porous carrier and a basic amino acid and/or organic amine compound supported thereon.

According to the present invention, the nitrogen dioxide absorbent is produced by a process which comprises impregnating a porous carrier sequentially with two aqueous solutions each containing a basic amino acid, for example, in an amount of 0.5–3.0 mol/l, preferably 1.0–2.0 mol/l, and an organic amine compound in an amount of 0.5–3.0 mol/l, preferably 1.0–2.0 mol/l, or with one aqueous solution containing a basic amino acid in an amount of 0.5–3.0 mol/l, preferably 1.0–2.0 mol/l, and/or an organic amine compound in an amount of 0.5–3.0 mol l, preferably 1.0–2.0 mol/l.

According to the present invention, impregnation is followed by drying at a temperature of 150° C. or below, preferably 100° C. or below.

It is another object of the present invention to provide a nitrogen dioxide absorbent which preferably comprises a porous carrier and a basic amino acid and organic amine compound and/or alkali hydroxide supported thereon.

According to the present invention, the nitrogen dioxide absorbent is also produced by a process which comprises impregnating a porous carrier with an aqueous solution containing a basic amino acid in an amount of, for example, 0.5–2.0 mol/l, preferably 0.8–1.5 mol/l, an organic amine compound in an amount of 0.5–3.0 equivalents, preferably 0.8–2.0 equivalents (based on the carboxylic acid of the amino acid), and/or an alkali hydroxide in an amount of 0.5–3.0 equivalents, preferably 0.8–2.0 equivalents (based on the carboxylic acid of the amino acid).

According to the present invention, impregnation is followed by drying at a temperature of 150° C. or below, preferably 100° C. or below.

According to the present invention, the porous carrier is a porous oxide having solid acid properties. The porous oxide having solid acid properties includes, for example, alumina, silica•alumina, titania, and zeolite. They can be used alone or in combination with one another.

A preferred example of the porous carrier is a porous oxide carrying one or more metals selected from the group consisting of Mn, Co, Fe, and Ni. It is produced by impregnating a porous oxide with an aqueous solution containing (or solutions each containing) inorganic acid salts (excluding sulfates) or organic acid salts of said metals in an amount of 0.5–5 mol/l, preferably 2–4 mol/l, at one time or sequentially.

The porous oxide should have a specific surface area of 30–500 $m^2/g$, preferably 60–120 $m^2/g$.

The porous oxide can be held in interstices between fibers of preform in the form of plate or honeycomb.

Another preferred example of the porous carrier is activated carbon. This activated carbon should have a specific surface area of 100–2000 $m^2/g$, preferably 300–600 $m^2/g$.

In addition, the activated carbon should preferably be in the form of a honeycomb.

According to the present invention, the basic amino acid should preferably be arginine, and the organic amine compound should preferably be guanidine. The alkali hydroxide should preferably be one or more than one member selected from lithium hydroxide, potassium hydroxide, and sodium hydroxide.

The nitrogen dioxide absorbent constructed as mentioned above is suitable for purification of ventilation gas discharged from road tunnels. It is capable of absorbing and removing $NO_2$ from ventilation gas passing at a flow rate of 0.05–10.0 Nm/s (in terms of superficial velocity).

A detailed description of the nitrogen dioxide absorbent in the present invention follows.

The reaction of an organic amine compound with $NO_2$ has long been known. This knowledge has been applied to a nitrogen dioxide absorbent composed of activated carbon and an aromatic (organic) amine compound having a low vapor pressure supported thereon. In addition, the reaction of ethanolamine with $NO_2$ is used for the analysis of nitrogen dioxide in air (known as "alkali filter paper method").

Unfortunately, since an organic amine compound bonds to a carrier only weakly and vaporizes slightly, there has been no practical absorbent which withstands prolonged use (up to several months or one year) for a large amount of gas.

In order to address the above-mentioned problems, the present inventors have developed a new nitrogen dioxide absorbent composed of a carrier of solid acid or activated carbon having an additional denaturing catalytic action on $NO_x$ and a basic amino acid or guanidine supported thereon which is solid at normal temperature and has a very low vapor pressure. The basic amino acid or guanidine bonds strongly to a solid acidic oxide as the carrier and becomes adsorbed strongly by activated carbon.

The nitrogen dioxide absorbent of the present invention is composed of a carrier of solid acid or activated carbon and a basic amino acid or guanidine supported thereon. It functions as an excellent nitrogen dioxide absorbent which can be used under severe conditions as mentioned above.

The above-mentioned nitrogen dioxide absorbent as such is of practical use; however, the present inventors have found a way to improve its performance further.

An amino acid usually has an amino group (basic) and a carboxyl group (acid). The former serves to fix $NO_2$, but the latter does not. On the other hand, both arginine and guanidine have an imido group (HN=C), which, like an amino group, reacts with the solid acid site, thereby helping arginine and guanidine to be fixed to the carrier surface. This results in an increase in free amino groups useful for the fixing of $NO_2$. Arginine and guanidine vaporize less than other organic amine compounds and hence are highly capable of fixing $NO_2$.

The carboxyl group in arginine is close to the amino group as the structural formula [I] shows below. It does not serve to fix $NO_2$, but it also prevents the diffusion of $NO_3^-$, $NO_2^-$, etc. from one amino group to another.

Formula [I]

Upon reaction with a basic compound, this carboxyl group effectively fixes $NO_2$, thereby increasing the absorbing capacity of the absorbent. Especially, guanidine (shown by the formula [II] below) as the basic compound provides only amino groups useful for the diffusion of $NO_2$; therefore, it reduces the factor to prevent the diffusion.

Formula [II]

The easy diffusion of $NO_2$ not only increases the rate of absorption of $NO_2$ but also helps to fix $NO_2$ in the broader area around the catalytic active site. This leads to an increase in absorbing capacity.

Figure 6:
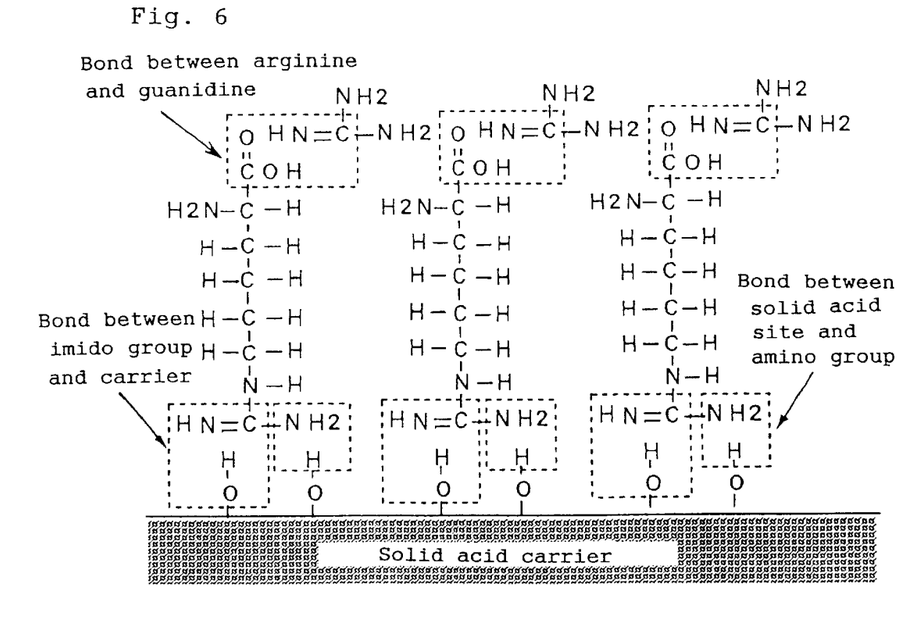
FIG. 6 is a conceptual diagram showing the postulated surface structure of the nitrogen dioxide absorbent.

The foregoing is illustrated in FIG. 6.

According to a preferred embodiment, preferred nitrogen dioxide absorbent is obtained by preparing a titania carrier incorporated with Mn and then impregnating the carrier with an aqueous solution containing arginine and alkali hydroxide or guanidine in approximately equimolar amounts, followed by drying. In practice, however, the alkali hydroxide or guanidine should be used in an amount slightly more than arginine because it reacts directly with the acid site of the carrier.

The absorbing capacity for $NO_2$ increases with the increasing amount of arginine supported; however, an excess amount of arginine clogs the pores of the catalyst and covers the active site of the catalyst, thereby decreasing the absorbing rate.

Both activated carbon and solid acid produce almost the same effect when used as the carrier for the nitrogen dioxide absorbent. The effect produced by the addition of arginine is lower than this.

In general, as compared with solid acid as the carrier, activated carbon has a larger specific surface area but a smaller pore diameter and hence a lower critical supporting amount (per specific surface area) which does not lower the absorbing rate.

The nitrogen dioxide absorbent of the present invention exhibits its essential functions by virtue of:
(1) the solid acid carrier or activated carbon carrier provided with the denaturing catalytic action on $NO_x$, and
(2) the basic amino acid and organic amine compound or alkali hydroxide supported on the carrier.

Therefore, its performance is not greatly affected by the carrier's fine surface structure (such as crystal form, pore distribution, acidity, surface electron density distribution, and oxide surface coordination number), nor is it essentially affected by the type of basic amino acid and organic amine compound used.

DESCRIPTION OF THE PREFERRED EMBODIMENTS

The following examples demonstrate the production and the performance and characteristic properties of the nitrogen dioxide absorbent according to the present invention.

In the following examples, titania is used as the solid acid carrier and pitch-based activated carbon is used as the activated carbon; however, the use of these carriers is not intended to limit the nitrogen dioxide absorbent of the present invention.

EXAMPLE 1

(a) Preparation of nitrogen dioxide absorbent in lamellar form based on a solid acid carrier:

A piece of ceramics paper (0.5 mm thick, made by Nippon Muki Co., Ltd.) was immersed in a 34% by weight colloidal solution of titania ($TiO_2$) as solids, followed by drying at 120° C. in the air. This step permits titania to be held in interstices between ceramics fibers constituting the ceramics paper.

After repeating the above-mentioned step, there was obtained a lamellar solid acid carrier composed of ceramics paper and anatase-type titania supported thereon.

The amount of titania in this lamellar carrier was 420 g/m² (per basis weight of paper).

The carrier was then immersed in an aqueous solution containing 3.0 mol/l of manganese nitrate ($Mn(NO_3)_2$) for 30 minutes, followed by drying at 120° C. in the air and firing at 400° C. for 3 hours in an air stream. Thus there was obtained a lamellar carrier carrying Mn and having the $NO_2$-modified catalytic activity. The amount of Mn supported on this carrier was 3.2 mmol/g ($TiO_2$) and the specific surface area was 87 m²/g.

The above-mentioned carrier was immersed in an aqueous solution of L-arginine (1.3 mol/l) and guanidine (1.5 mol/l) for 30 minutes, followed by drying at 60° C. in an air stream. Thus there was obtained a nitrogen dioxide absorbent (A) in lamellar form.

(b) Performance of nitrogen dioxide absorbent based on a solid acid carrier:

Two pieces of the absorbent (A) in lamellar form (100 mm×35 mm) were placed in an absorbing tube. A standard gas of the composition shown in Table 1 was passed through the absorbing tube at a flow rate of 2 l/min.

TABLE 1

| NO | 1.2 ppm |
|---|---|
| $NO_2$ | 0.12 ppm |
| Relative humidity | 60% |
| Air | Remainder |

The inflow and outflow gases were sampled and analyzed for $NO_2$ concentration. The rate of $NO_2$ absorption was calculated by the equation below.

Rate of $NO_2$ absorption=(A−B)/A×100 where,

A: concentration of $NO_2$ in inflow gas, and

B: concentration of $NO_2$ in outflow gas.

This measurement was carried out for a predetermined time. Subsequently, an accelerating gas of the composition shown in Table 2, which contains a large amount of $NO_2$, was passed through the absorbing tube for a predetermined time. The rate of $NO_2$ absorption was calculated and the cumulative amount of absorption was measured.

TABLE 2

| NO | 50.0 ppm |
|---|---|
| $NO_2$ | 30.0 ppm |
| Relative humidity | 60% |
| Air | Remainder |

After that, the standard gas was passed again, and the rate of $NO_2$ absorption in the low concentration region was measured.

This procedure was repeated four times, and the relation between the amount of $NO_2$ absorption and the rate of $NO_2$ absorption was obtained. The results are shown in FIG. 7.

Figure 7:
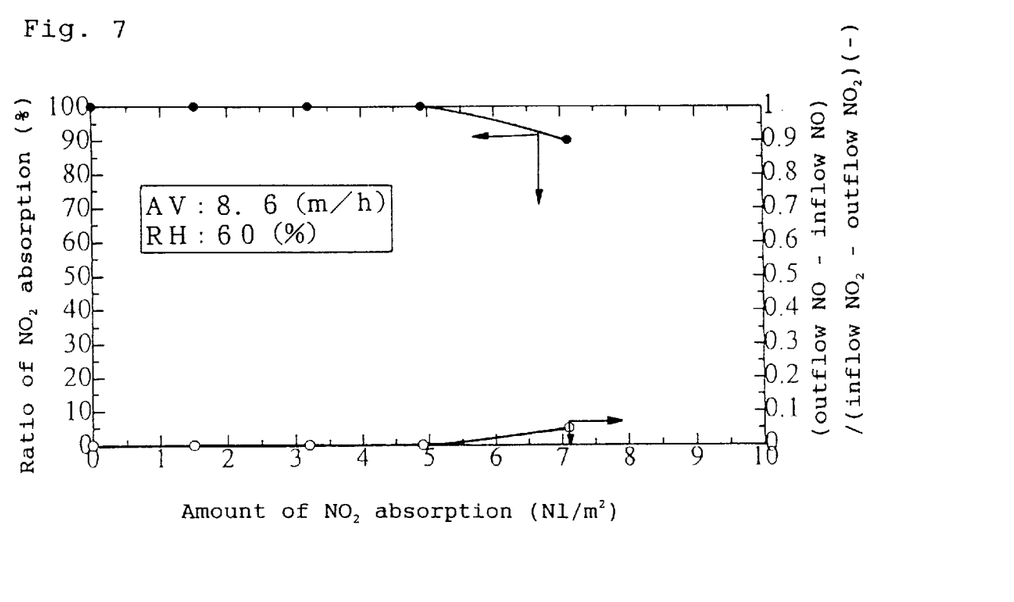
FIG. 7 is a graph showing the relation between the amount of $NO_2$ absorption and the ratio of $NO_2$ absorption.

It is noted from FIG. 7 that the rate of absorption remained at almost 100% until the amount of $NO_2$ absorption reached 5 l/m² after the start of absorption, and the rate of absorption decreased to about 90% when the amount of absorption reached 7 l/m².

EXAMPLE 2

(a) Preparation of nitrogen dioxide absorbent in honeycomb form based on an activated carbon carrier:

A honeycomb of activated carbon made by Takeda Chemical Industries, Ltd., which had been dried at 80° C. in the air, was immersed in an aqueous solution containing 0.8 mol/l of guanidine for 30 minutes, followed by drying at 60° C. Thus there was obtained a nitrogen dioxide adsorbent (B) in honeycomb form based on activated carbon carrier supporting guanidine.

This adsorbent (B) has a specific surface area of 490 m²/g.

(b) Performance of nitrogen dioxide adsorbent based on an activated carbon carrier:

The nitrogen dioxide adsorbent (B) was cut into pieces, each measuring 20 mm×20 mm×50 mm, and they were placed in an absorbing tube. A standard gas of the composition shown in Table 1 was passed through the absorbing tube at a flow rate of 6 l/min.

Figure 8:
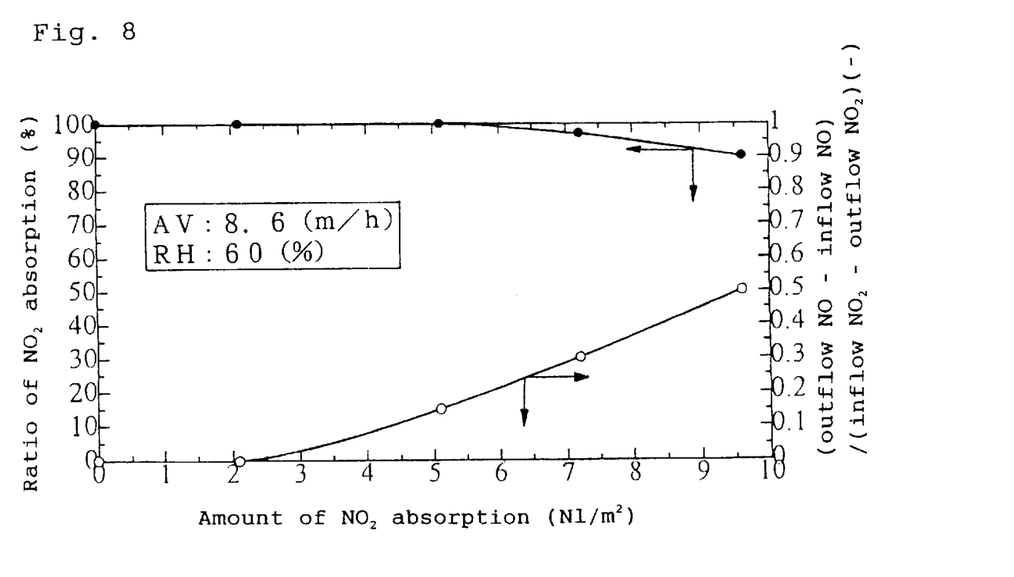
FIG. 8 is a graph showing the relation between the amount of $NO_2$ absorption and the ratio of $NO_2$ absorption.

Subsequently, the same procedure as (b) in Example 1 was repeated to obtain the relation between the amount of $NO_2$ absorption and the rate of $NO_2$ absorption. The results are shown in Table 8.

It is noted from FIG. 8 that, as in Example 1, the rate of absorption remained at almost 100% until the amount of $NO_2$ absorption reached 5 l/m² after the start of absorption, and the rate of absorption decreased to about 90% when the amount of absorption reached about 10 l/m².

EXAMPLE 3

Nitrogen dioxide absorbent based on a metal-containing carrier, and performance of modified catalyst:

The same procedure as (a) in Example 1 was repeated to give nitrogen dioxide absorbents (C) to (I), except that the metal salt added was changed by those shown in Table 3.

TABLE 3

| Code | Metal salt added | Amount added (mmol/g $TiO_2$) | Specific surface area (m²/g) | Amount of $TiO_2$ supported (g/m²) (basis weight) | Rate of $NO_2$ absorption |
|---|---|---|---|---|---|
| A | Manganese nitrate | 3.2 | 87 | 420 | 80 |
| C | Manganese chloride | 3.5 | 82 | 395 | 75 |
| D | Manganese nitrate | 2.0 | 94 | 402 | 76 |
| E | Manganese nitrate | 4.5 | 80 | 435 | 78 |
| F | Cobalt nitrate | 3.0 | 85 | 415 | 78 |
| G | Iron (II) nitrate | 2.9 | 89 | 414 | 79 |
| H | Nickel nitrate | 3.2 | 85 | 420 | 79 |
| I | Magnesium nitrate | 3.1 | 88 | 418 | 28 |
| J | None | — | 118 | 418 | 25 |

Each of the nitrogen dioxide absorbents (C) to (I), measuring 100 mm×35 mm, was placed in an absorbing tube. A standard gas of the composition shown in Table 1 was passed through the absorbing tube at a flow rate of 4 l/min, and the rate of absorption (initial performance) was measured. The results are shown in Table 3. It is noted that magnesium nitrate does not contribute to the rate of $NO_2$ absorption.

EXAMPLE 4

Synergistic effect of arginine and organic amine compound and/or alkali hydroxide (in the case of solid acid carrier)

The lamellar carrier incorporated with Mn in Example 1 was given arginine and organic amine compound and/or alkali hydroxide in different concentrations (as shown in Table 4). Using this carrier, there were obtained nitrogen dioxide absorbents (K) to (T) in the same manner as in Example 1. These absorbents were tested for performance in the same manner as (b) in Example 1. Table 4 shows examples of concentrations of immersion solutions and $NO_2$ absorption performance.

TABLE 4

| Code | Concentration of solution (mol/l) | | | | | NO$_2$ absorption (%) | |
| --- | --- | --- | --- | --- | --- | --- | --- |
| | Arginine | Guanidine | KOH | NaOH | LiOH | Initial | After absorption of NO$_2$ (7 l/m$^2$) |
| K | 0.8 | 1.0 | — | — | — | 100 | 73 |
| L | 1.3 | 1.0 | — | — | — | 100 | 88 |
| M | 1.3 | 2.0 | — | — | — | 98 | 91 |
| N | 2.0 | 2.2 | — | — | — | 96 | 93 |
| O | 1.3 | — | 1.5 | — | — | 100 | 85 |
| P | 1.3 | — | — | 1.5 | — | 100 | 84 |
| Q | 1.3 | — | — | — | 1.5 | 100 | 85 |
| R | 2.0 | — | — | — | — | 100 | 48 |
| S | — | 2.0 | — | — | — | 100 | 42 |
| T | — | — | 2.0 | — | — | 100 | 30 |

EXAMPLE 5

Synergistic effect of arginine and organic amine compound and/or alkali hydroxide (in the case of activated carbon carrier)

The activated carbon carrier was given arginine and organic amine compound and/or alkali hydroxide in the same way as in Example 2. Thus there were obtained nitrogen dioxide absorbents (AC-1) to (AC-7). They were tested for performance. (The samples were cut into smaller pieces, each measuring 20 mm×20 mm×25 mm, so that the rate of NO$_2$ absorption was low.) The results are shown in Table 5.

120° C. in the air for 3 hours and firing at 400° C. for 5 hours. Thus there were obtained solid acid carriers incorporated with manganese. They were immersed in an aqueous solution containing 1.3 mol/l of L-arginine and 1.5 mol/l of guanidine for 30 minutes, followed by drying at 60° C. in the air for 5 hours. There were obtained nitrogen dioxide absorbents in granular form (PP-1) to (PP-7).

4 ml each of these absorbents was placed in an absorbing tube. A standard gas of the composition shown in Table 1 was passed through the absorbing tube at a flow rate of 2 l/min, and the inflow and outflow gases were analyzed for

TABLE 5

| Code | Concentration of solution (mol/l) | | | | NO$_2$ absorption (%) | |
| --- | --- | --- | --- | --- | --- | --- |
| | Arginine | Guanidine | KOH | NaOH | Initial | After absorption of NO$_2$ (7 l/m$^2$) |
| AC-1 | 0.6 | — | — | — | 65 | 42* |
| AC-2 | 0.8 | — | — | — | 60 | 40* |
| AC-3 | 1.0 | — | — | — | 57 | 38* |
| AC-4 | — | 0.6 | — | — | 74 | 58* |
| AC-5 | — | 0.8 | — | — | 75 | 65* |
| AC-6 | — | 1.0 | — | — | 70 | 66 |
| AC-7 | — | 0.8 | 0.2 | — | 71 | 61 |

*discharged NO (equivalent to 1/2 to 1/4 of NO$_2$ absorbed)

EXAMPLE 6

Synergistic effect of arginine and organic amine compound and/or alkali hydroxide (in the case of granular carrier)

Each of solid acid granular carriers (8 to 14 mesh in size) was immersed in an aqueous solution containing 3.0 mol/l of manganese nitrate for 30 minutes, followed by drying at NO$_2$ concentration to determine the initial performance. Then, an accelerating gas of the composition shown in Table 2 was passed until the absorption of NO$_2$ reached 250 ml. At that point the accelerating gas was switched back to the standard gas, and the performance after NO$_2$ absorption was determined. The results are shown in Table 6.

TABLE 6

| | | Specific surface | Amount of Mn | Absorption of NO$_2$ (%) | |
| --- | --- | --- | --- | --- | --- |
| Code | Carrier | area (m$^2$/g) | added (mmol/g) | Initial | After absorption of 250 ml/g |
| PP-1 | Titania | 72.6 | — | 72.5 | 61.0 |
| PP-2 | Titania | 72.6 | 0.58 | 100 | 79.9 |
| PP-3 | γ-alumina | 123 | — | 78.8 | 65.2 |
| PP-4 | γ-alumina | 123 | 0.82 | 100 | 70.2 |
| PP-5 | Silica-alumina | 511 | 0.85 | 100 | 77.0 |
| PP-6 | Zeolite | 425 | 0.85 | 100 | 82.1 |
| PP-7 | Activated carbon | 1350 | — | 100 | 87.5* |

What is claimed is:

1. A nitrogen dioxide absorbent which comprises a porous carrier and a basic amino acid and an organic amine compound supported thereon.

2. A nitrogen dioxide absorbent as defined in claim 1, which further comprises an alkali hydroxide supported on the carrier.

3. A nitrogen dioxide absorbent which comprises a porous carrier and a basic amino acid and an organic amine compound and/or an alkali hydroxide supported thereon.

4. A nitrogen dioxide absorbent as defined in any of claims 1 to 3, wherein the porous carrier includes a porous oxide having solid acid properties.

5. A nitrogen dioxide absorbent as defined in claim 4, wherein the porous oxide having solid acid properties is one or more members selected from the group consisting of alumina, silica•alumina, titania and zeolite.

6. A nitrogen dioxide absorbent as defined in claim 5, wherein the porous carrier supports one or more metals selected from the group consisting of Mn, Co, Fe and Ni.

7. A nitrogen dioxide absorbent as defined in claim 5, wherein the carrier is one which is obtained by immersing a porous oxide in an aqueous solution or in solutions sequentially each containing 0.5–5 mol/l of inorganic acid salts (excluding sulfates) or organic acid salts of one or more members selected from the group consisting of Mn, Co, Fe and Ni.

8. A nitrogen dioxide absorbent as defined in claim 4, wherein the porous oxide has a specific surface area of 30–500 $m^2$/g.

9. A nitrogen dioxide absorbent as defined in claim 4, wherein the porous oxide is held in interstices between fibers of preform in lamellar or honeycomb form.

10. A nitrogen dioxide absorbent as defined in any of claims 1 to 3, wherein the porous carrier is activated carbon.

11. A nitrogen dioxide absorbent as defined in claim 10, wherein the activated carbon has a specific surface area of 100–2000 $m^2$/g.

12. A nitrogen dioxide absorbent as defined in claim 10, wherein the activated carbon is in a honeycomb form.

13. A nitrogen dioxide absorbent as defined in any of claims 1 to 3, wherein the basic amino acid is arginine.

14. A nitrogen dioxide absorbent as defined in any of claims 1 to 3, wherein the organic amine compound is guanidine.

15. A nitrogen dioxide absorbent as defined in claim 2 or 3, wherein the alkali hydroxide is one or more members selected from the group consisting of lithium hydroxide, potassium hydroxide and sodium hydroxide.

16. A process for producing the nitrogen dioxide absorbent defined in claim 1, said process comprising impregnating the porous carrier sequentially with two solutions each containing 0.5–3.0 mol/l of the basic amino acid and 0.5–3.0 mol/l of the organic amine compound, or impregnating the porous carrier sequentially with a solution containing 0.5–3.0 mol/l of the basic amino acid and/or 0.5–3.0 mol/l the organic amine compound.

17. A process for producing the nitrogen dioxide absorbent defined in claim 3, said process comprising impregnating the porous carrier sequentially with an aqueous solution containing 0.5–2.0 mol/l of the basic amino acid and 0.5–3.0 equivalents (based on the carboxylic acid of the amino acid) of the organic amine compound and/or 0.5–3.0 equivalents (based on the carboxylic acid of the amino acid) of the alkali hydroxide.

18. A process as defined in claim 16 or 17, wherein the porous carrier after impregnation is dried at 150° C. or below.

19. A method for purifying ventilation gas from road tunnels, said method comprising passing the gas through the nitrogen dioxide absorbent defined in any of claims 1 to 3 at a flow rate of 0.05–10.0 Nm/s (in terms of superficial velocity).

* * * * *